(12) United States Patent
Carlson et al.

(10) Patent No.: US 10,188,031 B2
(45) Date of Patent: Jan. 29, 2019

(54) CUTTER BLADE AND ASSEMBLY FOR A ROTARY CUTTER

(71) Applicant: Great Plains Manufacturing, Inc., Salina, KS (US)

(72) Inventors: Jason Carlson, Lindsborg, KS (US); Jeff Welsh, Abilene, KS (US)

(73) Assignee: Great Plains Manufacturing, Inc., Salina, KS (US)

(*) Notice: Subject to any disclaimer, the term of this patent is extended or adjusted under 35 U.S.C. 154(b) by 6 days.

(21) Appl. No.: 15/418,251

(22) Filed: Jan. 27, 2017

(65) Prior Publication Data
US 2017/0208741 A1 Jul. 27, 2017

Related U.S. Application Data

(60) Provisional application No. 62/287,741, filed on Jan. 27, 2016.

(51) Int. Cl.
| | |
|---|---|
| *A01D 34/00* | (2006.01) |
| *A01D 34/76* | (2006.01) |
| *A01D 34/66* | (2006.01) |
| *A01D 34/81* | (2006.01) |
| *A01D 101/00* | (2006.01) |

(52) U.S. Cl.
CPC ........... *A01D 34/76* (2013.01); *A01D 34/664* (2013.01); *A01D 34/81* (2013.01); *A01D 2101/00* (2013.01)

(58) Field of Classification Search
CPC .... A01D 34/736; A01D 34/73; A01D 34/733; A01D 34/535; A01D 34/866; A01D 34/828; A01D 34/76; A01D 34/664; A01D 34/81

USPC .......... 56/12.7, 255, 294, 295, 504; 30/276, 30/347; 403/344, 316
See application file for complete search history.

(56) References Cited

U.S. PATENT DOCUMENTS

| | | | | |
|---|---|---|---|---|
| 2,963,844 A | * | 12/1960 | Engler | A01D 34/736 30/347 |
| 3,388,581 A | * | 6/1968 | Mercer, Jr. | A01D 34/736 72/324 |
| 3,418,793 A | * | 12/1968 | Brewer | A01D 34/63 56/295 |
| 4,525,990 A | * | 7/1985 | Zweegers | A01D 34/736 56/295 |
| 6,055,798 A | * | 5/2000 | Fulmer | A01D 34/733 403/344 |
| 6,119,350 A | * | 9/2000 | Sutliff | A01D 34/736 30/276 |
| 6,829,878 B1 | * | 12/2004 | Hoffman | A01D 34/736 56/295 |
| 7,506,494 B2 | * | 3/2009 | Eavenson, Sr. | A01D 34/733 56/17.5 |
| 7,703,267 B2 | * | 4/2010 | Tapper | A01D 34/733 56/255 |

(Continued)

*Primary Examiner* — Robert E Pezzuto
(74) *Attorney, Agent, or Firm* — Hovey Williams LLP

(57) ABSTRACT

A blade assembly for a rotary cutter. The blade assembly comprises a blade carrier rotatably connected to the rotary cutter. The blade assembly additionally comprises one or more cutter blades secured to the blade carrier such that rotation of the blade carrier causes a corresponding rotation of the cutter blades. The blade assembly further comprises a blade stop associated with the blade carrier and configured to inhibit rotation of the cutter blades with respect to the blade carrier.

17 Claims, 14 Drawing Sheets

(56) References Cited

U.S. PATENT DOCUMENTS

| | | | |
|---|---|---|---|
| 7,878,097 B2* | 2/2011 | Strader | A01D 34/733 30/276 |
| 8,205,423 B2* | 6/2012 | Koorn | A01D 34/733 56/295 |
| 8,510,959 B2* | 8/2013 | Whitenight | A01D 34/733 30/276 |
| 8,776,489 B2* | 7/2014 | Tepe | A01D 34/828 56/295 |
| 9,420,742 B2* | 8/2016 | Martinez | A01D 34/733 |
| 9,545,053 B2* | 1/2017 | Fay, II | A01D 34/736 |
| 2014/0126952 A1* | 5/2014 | Fay, II | A01D 34/733 403/161 |
| 2014/0150267 A1* | 6/2014 | Sowell | A01D 34/4166 30/123 |
| 2017/0020063 A1* | 1/2017 | Guiet | A01D 34/733 |

\* cited by examiner

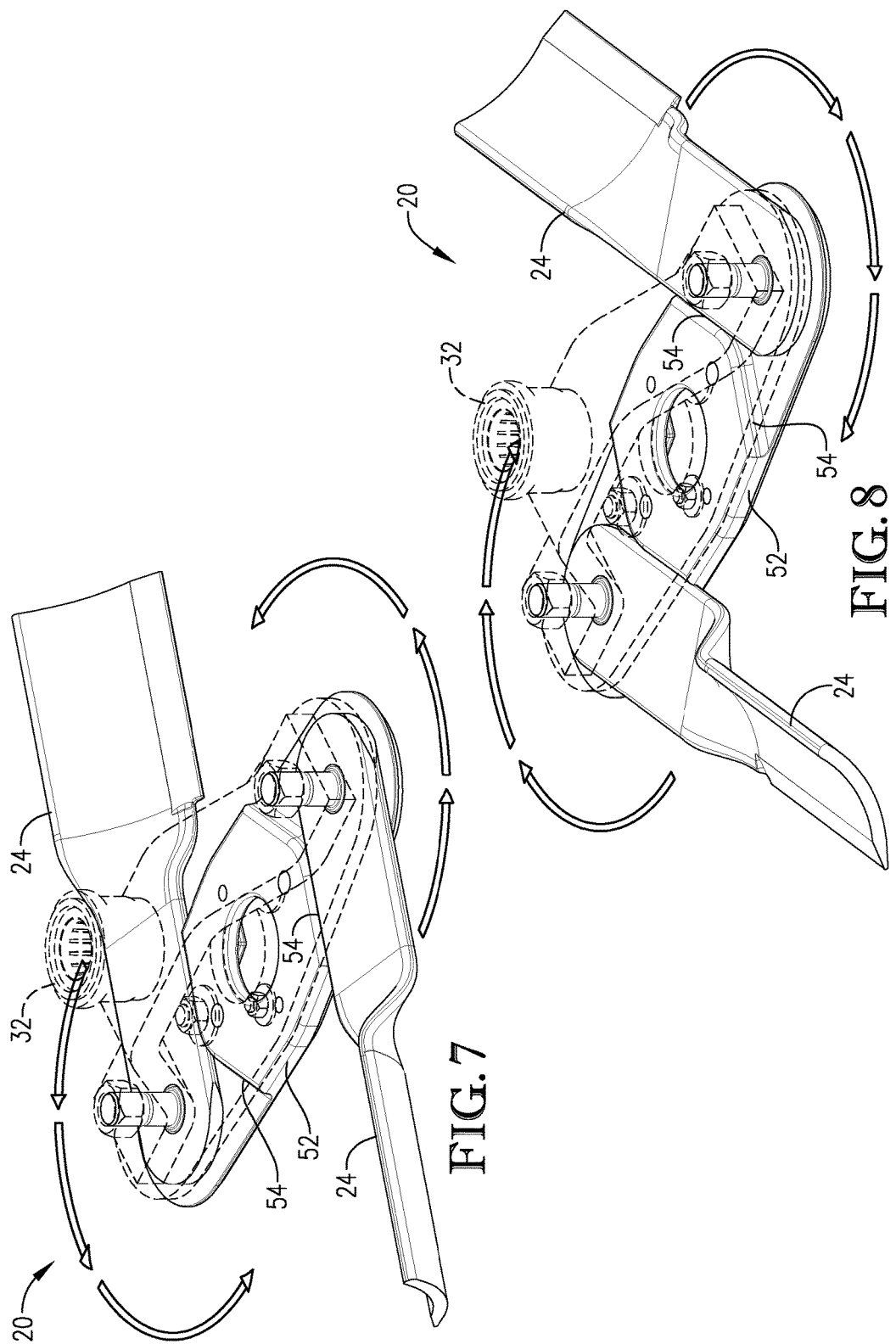

CUTTER BLADE AND ASSEMBLY FOR A ROTARY CUTTER

CROSS-REFERENCE TO RELATED APPLICATIONS

The present non-provisional patent application claims priority to earlier-filed U.S. Provisional Patent Application Ser. No. 62/287,741, filed on Jan. 27, 2016, and entitled "CUTTER BLADE FOR A ROTARY CUTTER." The entirety of the above-identified provisional patent application is herein incorporated by reference.

FIELD

Embodiments of the present invention are directed to a cutter blade and a cutter blade assembly for agricultural equipment. More particularly, embodiments of the present invention are directed to a cutter blade and a cutter blade assembly configured for use with for a rotary cutter.

BACKGROUND

Rotary cutters are agricultural implements used for cutting large areas of vegetation, such as grass, weeds, shrubs, or the like. In general, a rotary cutter comprises a deck, which is supported above the ground by one or more wheels. The rotary cutter additionally includes one or more rotating blade assemblies that extend from a bottom of the deck. The blade assemblies each include one or more rotating blades configured to cut vegetation as the rotary cutter travels over the ground. Certain types of rotary cutters are configured to be pulled behind a heavy-equipment machine, such as a tractor. As such, rotary cutters are capable of traversing the ground on which the vegetation to be cut is present.

In previously used rotary cutters, the cutter blades used in the blade assemblies were commonly known to become locked in skewed orientations with respect to their respective blade assemblies. Such locking of the cutter blades in a skewed orientation inhibited cutting action. In addition, such previously-used cutter blades were often known to cause unwanted vibrations throughout the rotary cutters. The inventors of the present invention have determined that such problems were due, in part, to the previously-used cutter blades having low centers of gravity (the term "low" is used herein to mean located in a direction away from the deck of the rotary cutter and towards the ground when the blade assemblies extend from a bottom of the deck). As discussed herein, the term "center of gravity" is used to mean a point in or on the cutter blade that defines the cutter blade's center of mass.

In general, the center of gravity of previously-used cutter blades was generally positioned below a horizontal plane that bisected a height of the cutter blade (with the height being defined as a distance from a lowest point of the cutter blade to a highest point of the cutter blade). Such low centers of gravity were due, in part, to previously-used cutter blades being "vertically offset." Specifically, free-ends of most previously-used cutter blades were positioned lower than (i.e., vertically-offset from) the proximal ends of the cutter blades, with the proximal ends being connected to the blade assemblies. Such vertically-offset cutter blades were thought to be beneficial because the free-ends of the cutter blades would not impact the blade assemblies (or the cutter deck) if the cutter blades were permitted to freely rotate with respect to the cutter assemblies. As such, vertically-offset cutter blades could avoid causing damage to the rotary cutter, to the blade assemblies, and to the cutter blades themselves. Nevertheless, such vertically-offset cutter blades have drawbacks. For example, because such cutter blades extend far below the deck of the rotary cutter, they are prone to come into contact with the ground and/or debris when the rotary cutter is in operation.

SUMMARY

A blade assembly for a rotary cutter. The blade assembly comprises a blade carrier rotatably connected to the rotary cutter. The blade assembly additionally comprises one or more cutter blades secured to the blade carrier such that rotation of the blade carrier causes a corresponding rotation of the cutter blades. The blade assembly further comprises a blade stop associated with the blade carrier and configured to inhibit rotation of the cutter blades with respect to the blade carrier.

Embodiments of the present invention are also directed to a rotary cutter for cutting vegetation growing from the ground. The rotary cutter comprises a deck, one or more wheels for supporting the deck above the ground, and one or more rotatable blade assemblies extending below the deck. Each of the blade assemblies comprises a blade carrier and one or more cutter blades secured to the blade carrier, such that rotation of the blade carrier causes a corresponding rotation of the cutter blades. Each of the blade assemblies further comprise a blade stop associated with the blade carrier and configured to inhibit rotation of the cutter blades with respect to the blade carrier.

Embodiments of the present invention additionally comprise a method of operating a rotary cutter configured to be pulled behind a tractor. The method comprises the initial step of connecting the rotary cutter to the tractor, with the rotary cutter comprising one or more rotatable blade assemblies extending below the rotary cutter, and with each of the blade assemblies comprising one or more cutter blades rotatably secured to the blade assembly. Each blade assembly further comprises a blade stop for inhibiting rotation of the cutter blades with respect to the blade assembly. The method comprises the additional step of providing power to the rotary cutter to cause rotation of the blade assemblies. During the providing power step, the cutter blades are prevented from rotating more than 120 degrees from a radial extension with respect to the blade carrier.

BRIEF DESCRIPTION OF THE DRAWING FIGURES

Embodiments of the present invention are described in detail below with reference to the attached drawing figures, wherein:

FIG. 7 is a top perspective view of the blade assembly from FIGS. 4-6, with a portion of the blade assembly shown in phantom to illustrate cutter blades being restricted by a blade stop from rotating in a first direction with respect to the blade assembly;

FIG. 8 is another top perspective view of the blade assembly from FIG. 7, illustrating the cutter blades being restricted by the blade stop from rotating in a second direction with respect to the blade assembly;

Figure 1:
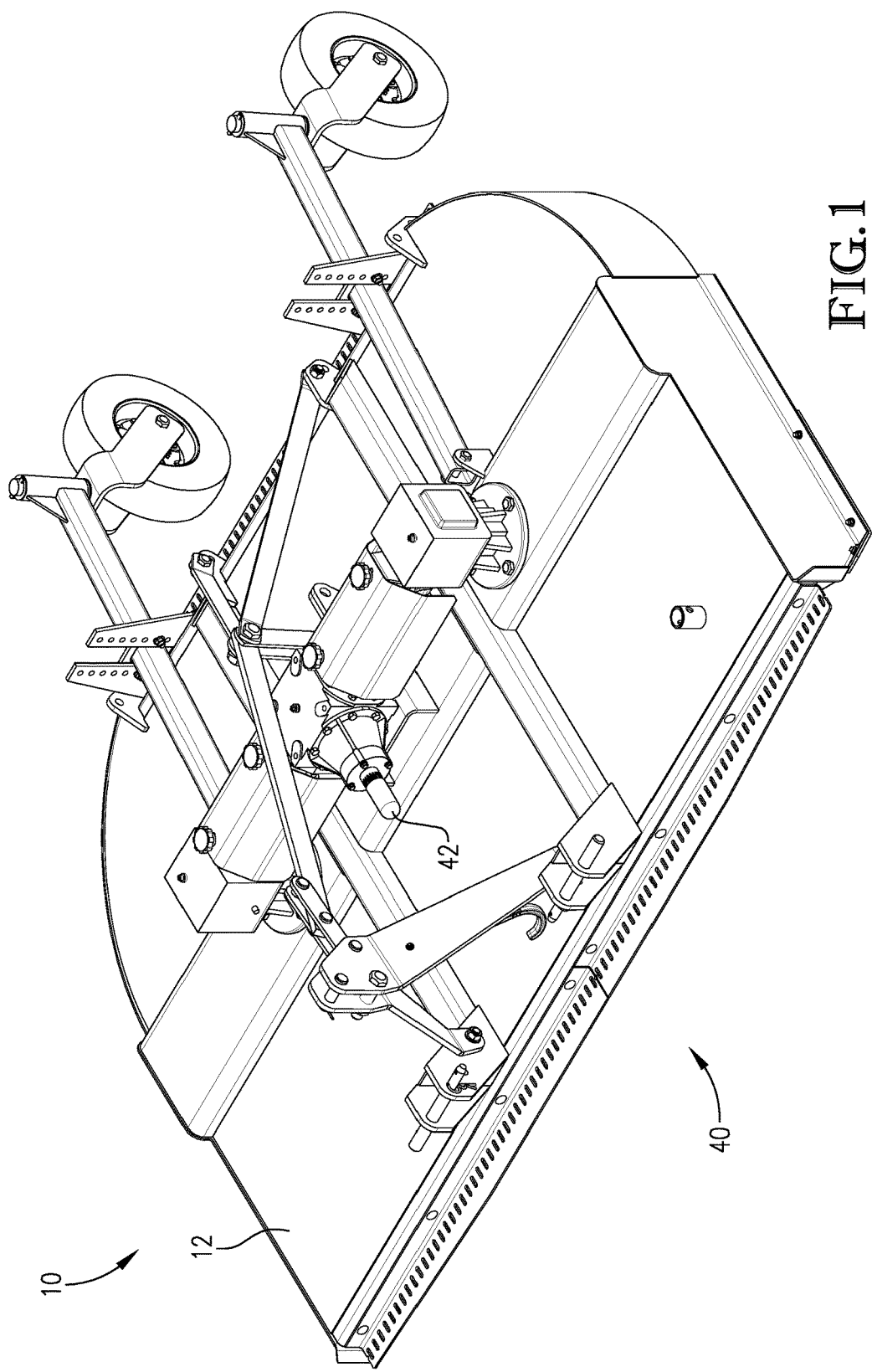
FIG. 1 is a top perspective view of a rotary cutter according to embodiments of the present invention.

The drawing figures do not limit the present invention to the specific embodiments disclosed and described herein. The drawings are not necessarily to scale, emphasis instead being placed upon clearly illustrating the principles of the invention.

DISCLOSURE

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the present technology can include a variety of combinations and/or integrations of the embodiments described herein.

The inventors of the present invention determined that due to the low center of gravity of previously-used rotary cutter blades, when a rotary cutter's blade assemblies are initially caused to rotate (e.g., via Power-Take-Off (PTO)/ gear boxes, motors, or the like), the impulse of such rotational forces acting on the cutter blade assemblies can cause the cutter blades to be forced into a skewed orientation. The rotational acceleration acting on the cutter blades can cause the cutter blades to be lifted into contact with the blade carrier of the blade assembly, or into engagement with the deck of the rotary cutter. The magnitude of the contact force was found to be related to the cutter blade's center of gravity and the amount of angular acceleration imparted to the cutter blade. If the contact force was too strong, the cutter blade would be prone to lock into engagement with the blade carrier (or the deck of the rotary cutter) at a skewed orientation and, due to the continuing power delivered by the PTO, motors, etc, the cutter blades were not permitted to return to a radial extension, which is preferred for efficient cutting action.

For example, in certain rotary cutters powered by a PTO of a tractor, upon initialization of the rotary cutter, the PTO can cause an impulse force that accelerates the cutter blades from 0 to 1200 rotations per minute (RPM) in less than 1 second. When previously-used cutter blades with low centers of gravity are used, such a high impulse force can cause the cutter blades to become locked in place against the blade carrier due to the large contact force. If the cutter blades are initially positioned in a skewed orientation (i.e., not in a radial extension with respect to the blade carrier), the cutter blades can remain locked in such a skewed orientation due to their engagement with the blade carrier and/or the rotary cutter deck. Such a skewed orientation can be problematic because it reduces the cutter blade's cutting efficiency. Furthermore such a skewed orientation can cause significant vibrations to be transmitted throughout the rotary cutter.

Embodiments of the present invention are broadly directed to a rotary cutter with cutter blades that include a relatively high center of gravity, so as to prevent the cutter blades from being forced upward into a skewed orientation during initialization of the rotary cutter. In addition, certain embodiments of the present invention broadly include a blade carrier that restricts cutter blades from freely rotating around the entirety of the cutter assembly, so as to prevent the cutter blades from impacting and damaging the cutter assembly and/or other portions of the rotary cutter.

Figure 2:
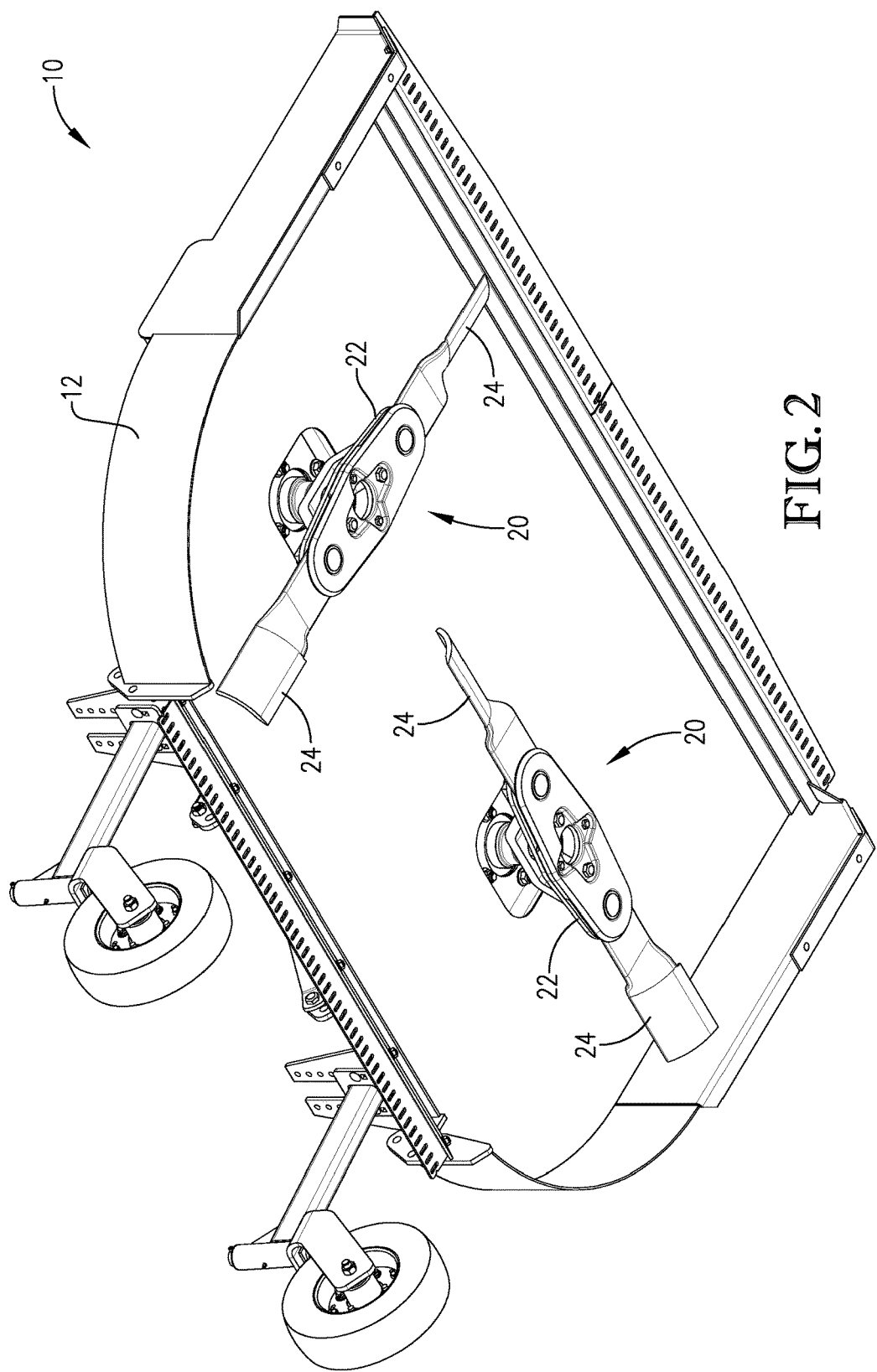
FIG. 2 is a bottom perspective view of a rotary cutter from FIG. 1, particularly illustrating blade assemblies extending from below a deck of the rotary cutter.
Figure 3:
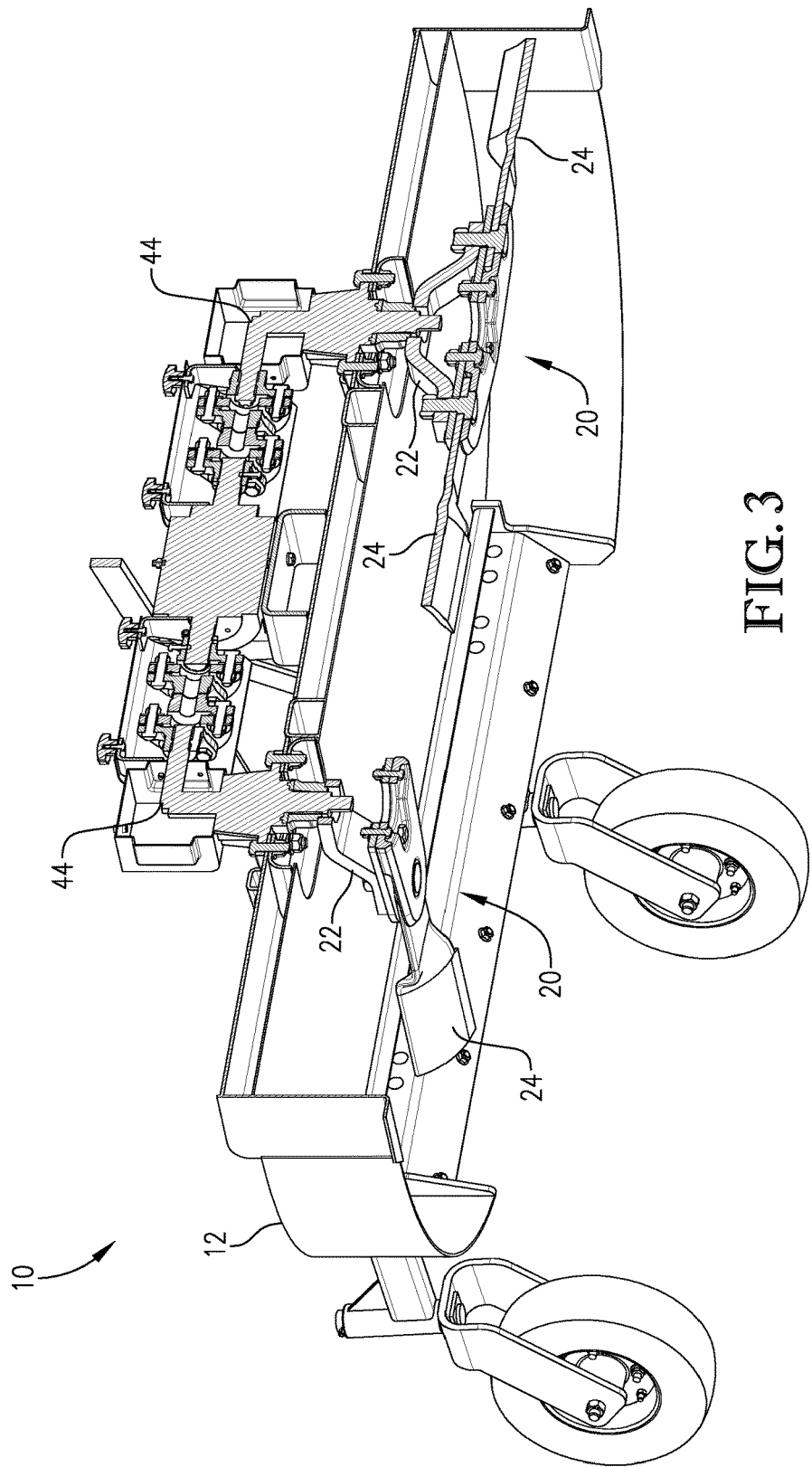
FIG. 3 is perspective cross-section view of the rotary cutter from FIGS. 2 and 3, with the cross-section taken through the blade assemblies of the rotary cutter.

FIGS. 1-3 illustrate a rotary cutter 10 according to embodiments of the present invention. The rotary cutter 10 will generally include a housing or a frame in the form of a deck 12. One or more wheels may extend from the deck 12 to support the rotary cutter 10 while it is being pulled by the tractor (not shown). As illustrated in FIGS. 2-3, the rotary cutter 10 may include one or more rotatable blade assemblies 20 extending from a bottom side of the deck 12. Specifically, each of the blade assemblies 20 may include a blade carrier 22 extending below the deck 12 and configured to support one or more cutter blades 24. However, in some other embodiments, the blade assemblies 20 may not include a blade carrier 22, but may, instead, include a dishpan, which may comprise a thin, disc-shaped piece of material rotatably secured underneath the deck 12 and configured to support one or more cutter blades 24.

Figure 4:
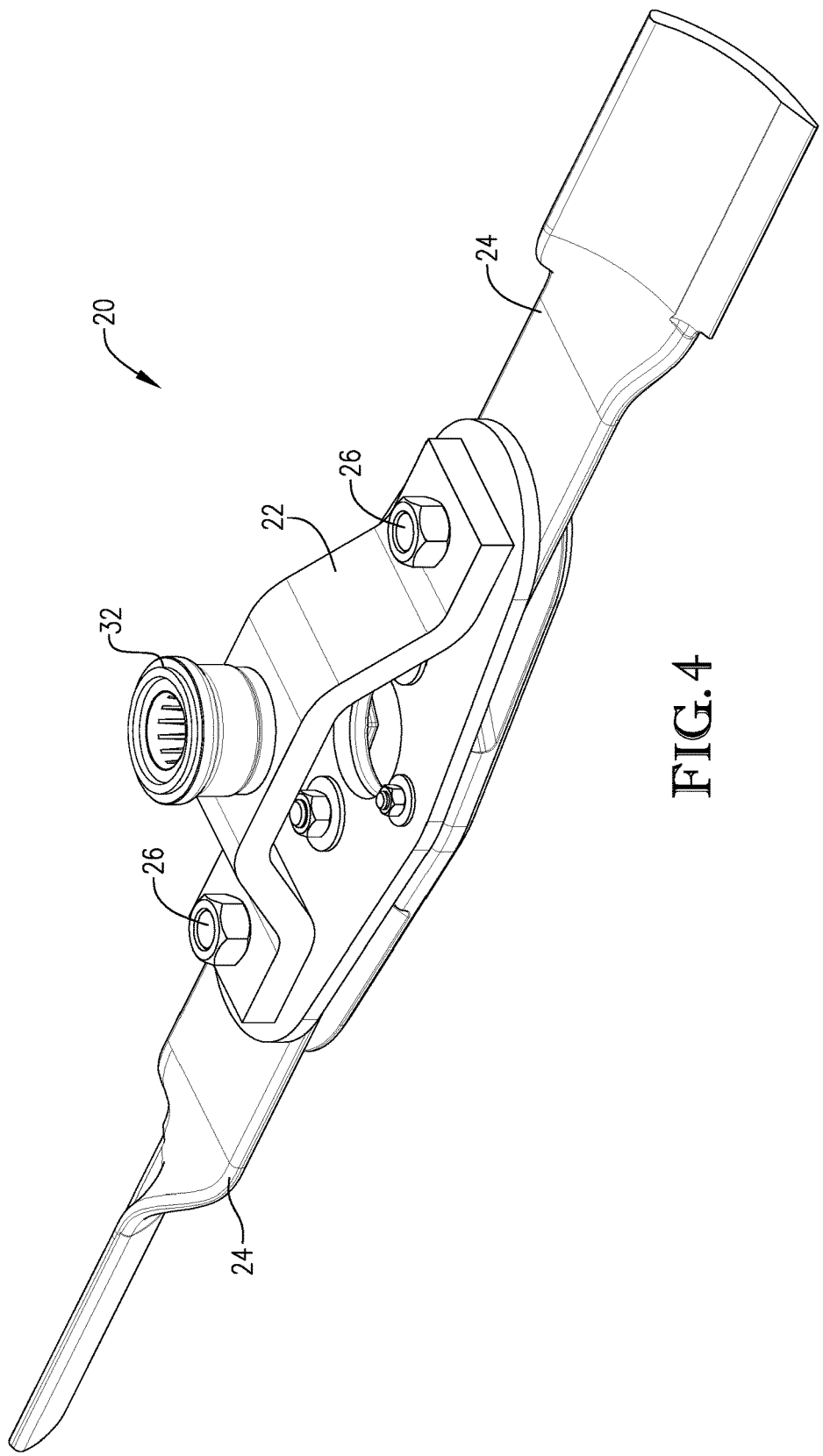
FIG. 4 is a top perspective view of a blade assembly according to embodiments of the present invention.
Figure 5:
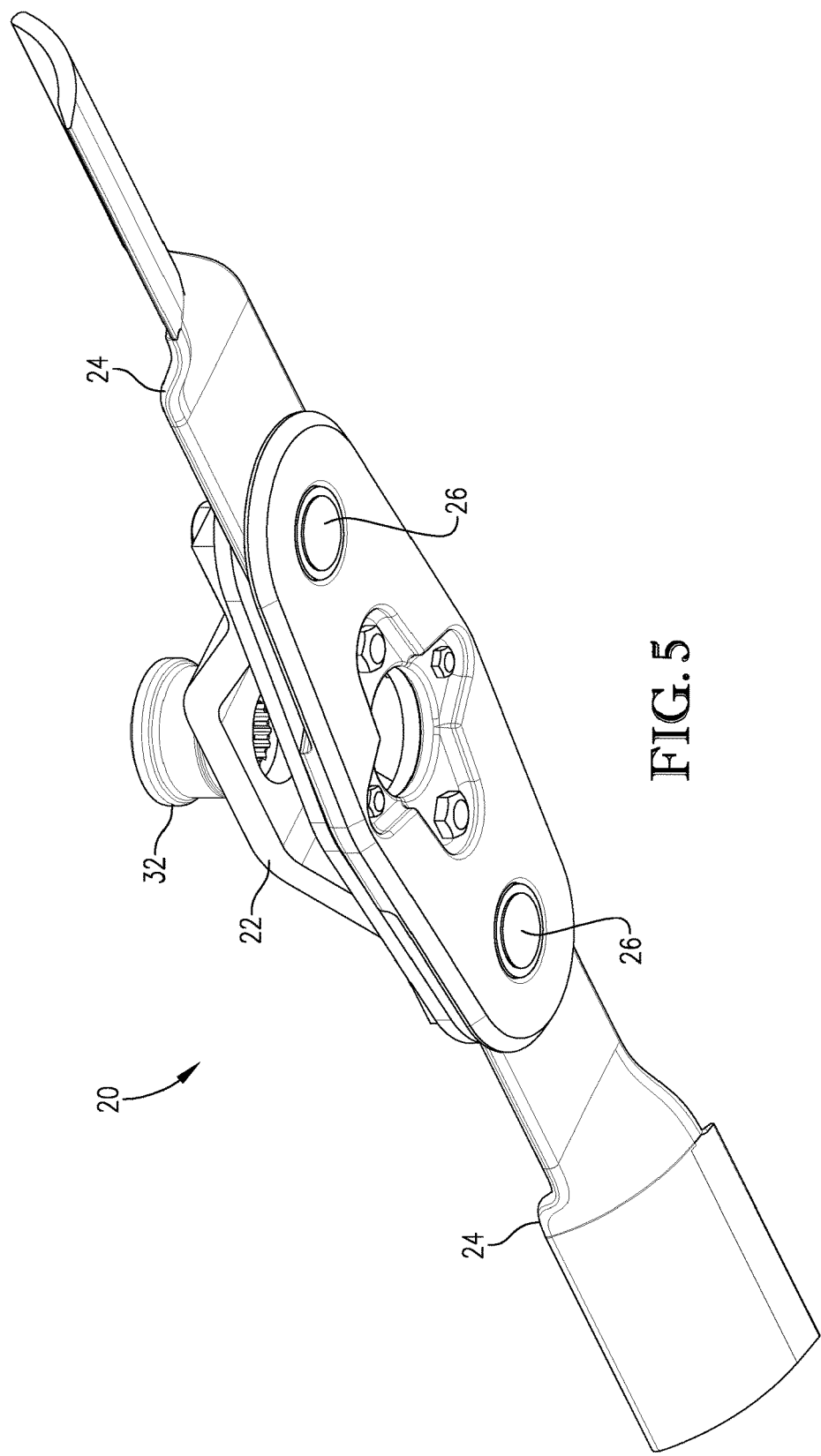
FIG. 5 is a bottom perspective view of the blade assembly from FIG. 4.
Figure 6:
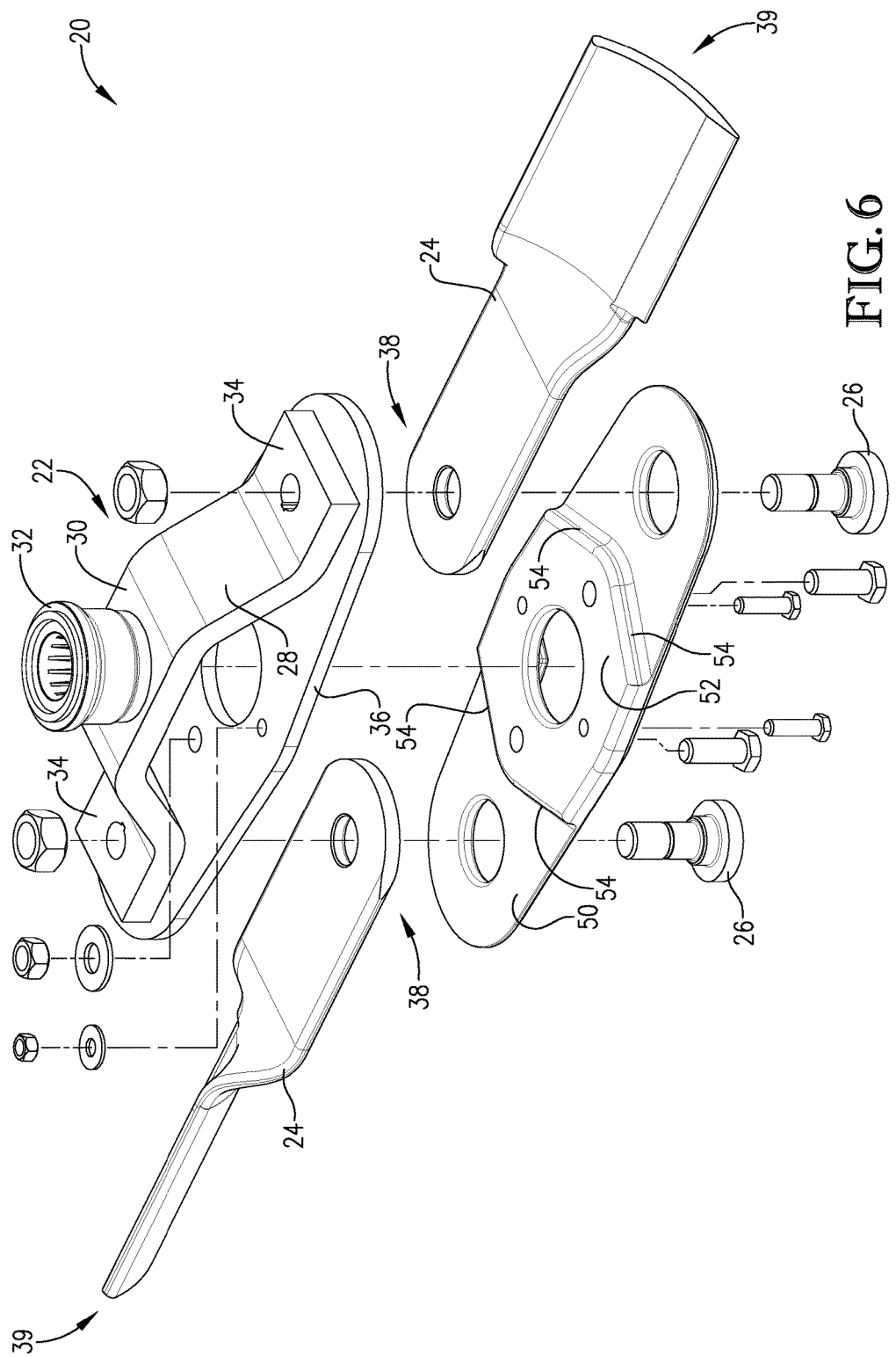
FIG. 6 is an exploded view of the blade assembly from FIGS. 4 and 5.

As shown in FIG. 4-6, each blade assembly 20 of embodiments of the present invention may include the blade carrier 22, which may have two or more (e.g., 3, 4, or more) cutter blades 24 pivotally secured thereto via a blade pin 26. As perhaps best shown in FIG. 6, the blade carrier 22 may include an upper portion 28 formed as an elongated section of metal that extends in opposite directions from its center 30. A top of the center 30 of the upper portion 28 may be connected to a rotation coupler 32. As described in more detail below, the rotation coupler 32 may be connected with rotary-power elements of the rotary cutter 10, so as to provide rotation to the blade assembly 20. The center 30 of the upper portion 28 may be raised with respect to outer ends 34 of the upper portion 28. As such, the cutter blades 24, which are secured to the blade carrier 22 at positions adjacent to the outer ends 34 of the upper portion 28, are configured to extend below the deck 12 of the rotary cutter 10. In some embodiments, the blade carrier 22 may also include a lower portion 36 secured to a bottom of the upper portion 28. The lower portion 36 may be a generally planar section of metal that is secured (e.g., via weld) to the bottom of the upper portion 28, and, particularly, to the outer ends 34 of the upper portion 28. As such, the blade carrier 22 may be presented to include a gap extending between the lower portion 36 and the center 30 of the upper portion 28.

As noted above, the cutter blades 24 may be connected to opposite ends of the blade carrier 22, such that the cutter blades 24 are generally configured to extend from opposite sides of the blade carrier 22. Specifically, with reference to FIG. 6, a first end ("proximal end" 38) of each of the cutter blades 24 may be pivotally secured to the blade carrier 22 via blade pin 26, or alternatively via a bolt (e.g., a shoulder bolt) or the like. A second end ("distal end" 39 or "free end") of each of the cutter blades 24 may extend away from the blade carrier 22. As such, when the blade carrier 22 is caused to rotate, each of the cutter blades 24 will correspondingly rotate, thereby, creating a cutting action for the rotary cutter 10 to cut vegetation.

In more detail, and returning back to FIG. 1, a rear side of the tractor (not shown) can be connected to a front side 40 of the rotary cutter 10, such that the rotary cutter 10 can be pulled from behind the tractor. In addition to pulling the rotary cutter 10, in some instances, the tractor can provide the rotary power required to rotate the blade assemblies 20 and, thus, the cutter blades 24 of the rotary cutter 10. For instance, as shown in FIG. 1, the rotary cutter 10 may include a power take off (PTO) connection 42 for connecting to a PTO of the tractor. In other embodiments, the rotary cutter 10 may include its own power source, such as an internal engine or motor, for powering the blade assemblies 20 and/or other features of the rotary cutter 10.

The rotary cutter 10 may include various mechanisms for transferring rotary power from the PTO (or from the engine or motor) to the blade assemblies 20. For instance, as shown in FIG. 3, each of the blade assemblies 20 may be associated with a gear box 44 configured to transfer rotational power down through the deck 12 to the blade assemblies 20. Specifically, rotational power may be provided by the PTO of the tractor to each of the gear boxes 44 (in some cases via one or more intermediate transfer gear boxes) via the PTO connection 42. Such rotational power may then be transitioned 90 degrees downward, via the gear boxes 44, to the blade assemblies 20 to cause rotation of the blade carriers 22. Rotation of the blade carriers 22 will cause a corresponding rotation of the cutter blades 24 so as to provide a cutting action for the rotary cutter 10. In alternate embodiments, the rotary cutter 10 may have one or more motors in place of the PTO and gear boxes, such that the motors are configured to provide rotary motion to the blade carriers 22 and to the cutter blades 24.

Returning to FIG. 6, and with further reference to FIGS. 7 and 8, certain embodiments of the present invention provide for the blade assembly 20 to include a base element 50 with a raised blade stop 52. The base element 50 may be secured to the blade carrier 22 by various methods of attachment, such as by fasteners or by weldments. For example, as shown in FIG. 6, the base element 50 may be connected to the lower portion 36 of the blade carrier 22 via nut and bolt combinations. With the cutter blades 24 attached to the bottom of the blade carrier 22, the base element 50 may be connected to a bottom side of the cutter blades 24, such that the cutter blades 24 are sandwiched between the blade carrier 22 and the base element 50. The blade pins 26 may extend through each of the blade carrier 22, the cutter blades 24, and the base element 50 so as to maintain each of the components together. Although the blade pin 26 secures the components together, the blade pin 24 is configured to permit rotation of the cutter blade 24 with respect to the remaining components of the blade assembly 20. As illustrated in FIG. 5, a bottom surface of the base element 50 may have beveled outer edges, which may facilitate movement of the rotary cutter 10 over the ground by reducing the chance that a blade assembly 20 is impeded by contact with the ground or with objects and debris.

Beneficially, the blade stop 52 of the base element 50 may function to restrict rotation of the cutter blades 24 with respect to the other components of the blade assembly 20 (e.g., blade carrier 22 and base element 50). As perhaps best illustrated by FIG. 6, the blade stop 52 may be raised with respect to the remaining portions of the base element 50, such that the blade stop 52 presents stop surfaces 54 that are configured to engage sides of the cutter blades 24 when the cutter blades 24 rotate too far with respect to the blade carrier 22. In more detail, during normal operation of the rotary cutter 10, the blade assemblies 20 are caused to rotate such that the cutter blades 24 will normally extend radially outward from a center of the blade assembly 20 (i.e., radially from the rotation coupler 32), as is illustrated in FIGS. 4 and 5. However, in some instances, such as during initialization of the rotary cutter 10 (i.e., when the blade assemblies 20 are initially caused to rotate during start-up of the rotary cutter 10), the cutter blades 24 may be forced out of a radial extension, such that they rotate with respect to the remaining portions of the blade assembly 20. In such instances, as shown in FIGS. 7 and 8, the cutter blades 24 will be forced into contact with the stop surfaces 54 of the raised blade stop 52 so as to prevent the cutter blades 24 from rotating too far (with respect to the blade assembly 20) and impacting and/or damaging the blade carrier 22. In some embodiments, the blade stop 52 may be configured to restrict the cutter blades 24 from rotating more than 70 degrees, more than 80 degrees, more than 90 degrees, more than 100 degrees, more than 110 degrees, more than 120 degrees, more than 130 degrees, or more than 140 degrees from a radial extension (with such a radial extension illustrated in FIGS. 4 and 5).

Figure 9:
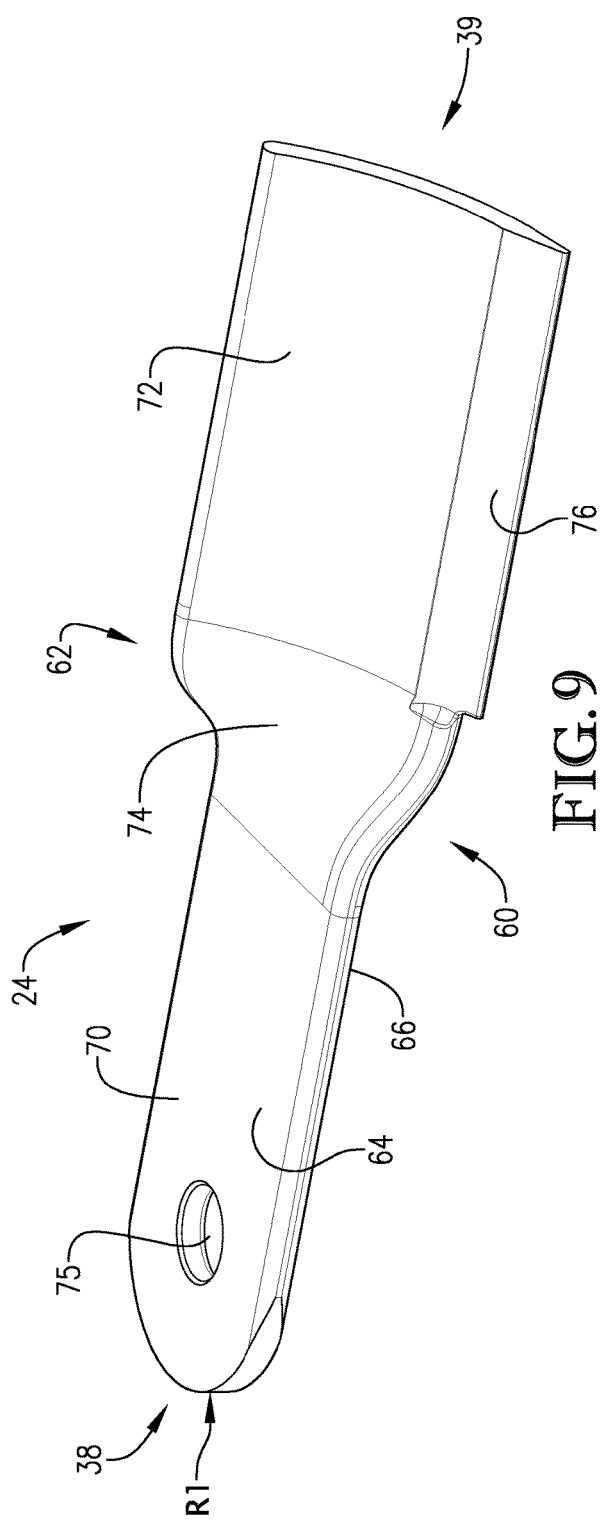
FIG. 9 is a perspective view of a straight blade cutter blade according to embodiments of the present invention.

In addition to the blade carrier 22, embodiments of the present invention are further directed to a cutter blade 24 designed to include a center of gravity that is generally higher than cutter blades previously used for rotary cutters. The cutter blade 24 of the present invention may be formed from various types of material with high strength and high durability, such as 5160 or 5160H heat treated steel. In more detail, as shown in FIG. 9, the cutter blade 24 of the present invention may broadly comprise a longitudinally-extending blade with proximal end 38, distal end 39, a leading edge 60, a back edge 62, an upper surface 64, and a lower surface 66. The proximal and distal ends 38, 39 are separated by a length of the cutter blade 24 and extend along a width of the cutter blade 24. The leading and back edges 60, 62 are separated by the width of the cutter blade 24 and extend along the length of the cutter blade 24. The upper and lower surfaces 64, 66 are separated by a thickness of the cutter blade 24 and extend between the length and the width of the cutter blade 24.

In more detail, and remaining with FIG. 9, the cutter blade may be comprised of three primary sections, including a base section 70, a cutting section 72, and a connecting section 74 that transitions between and connects the base section 70 and the cutting section 72. The base section 70 may extend from the proximal end 38 of the cutter blade 24 to the connecting section 74. The base section 70 may include a through-hole 75 or an opening by which the cutter blade 24 is securable to the blade carrier 22 via the blade pin 26, as was previously described.

The connecting section 74 may extend in a twisting manner from the base section 70 to the cutting section 72. Specifically, in some embodiments, as shown in FIG. 9, the leading edge 60 of the connecting section 74 may extend downward to the leading edge 60 of the cutting section 72, and the back edge 62 of the connecting section 74 may extend upward to the back edge 62 of the cutting section 72. As such, the connecting section 74 extends in a twisting manner from the base section 70 to the cutting section 72.

The cutting section 72 may extend from the connecting section 74 to the distal end 39 of the cutter blade 24. In some embodiments, the cutting section 72 may be shaped in the form of an airfoil that extends upward from the leading edge 60 to the back edge 62. The cutting section 72 may generally include a cutting surface 76, which extends along the leading edge 60 of the cutter blade 24. The cutting surface 76 may be sharpened to perform the cutting action of the cutter blade 24. In some embodiments, the cutting surface 76 may be milled, while in other embodiments, the cutting surface 76 may be formed by compressing the metal of the cutter blade 24 when it is in a malleable form. In some embodiments, the cutting surface 76 may extend along the entire length of the cutting section 72. In some embodiments, the cutting surface 76 may also extend along at least a portion of the connecting section 72.

In some embodiments, the cutter blade 24 according to embodiments of the present invention is configured as a "straight blade." As used herein, and with reference to FIG. 10, the term "straight blade" is defined to mean a cutter blade that includes a horizontal plane 80 that bisects a height "Hcs" of the cutting section 74 that is no more than 0.25*Hcs (the asterisk here is meant to indicate the multiplication operator), no more than 0.20*Hcs below, no more than 0.15*Hcs below, no more than 0.10*Hcs below, no more than 0.05*Hcs below, or not below (i.e., even with or located above) a horizontal plane 82 that bisects a thickness "Tbs" of the base section 70. Other embodiments of the present invention may be directed to a "vertically-offset blade," which will be described in more detail below.

Figure 10:
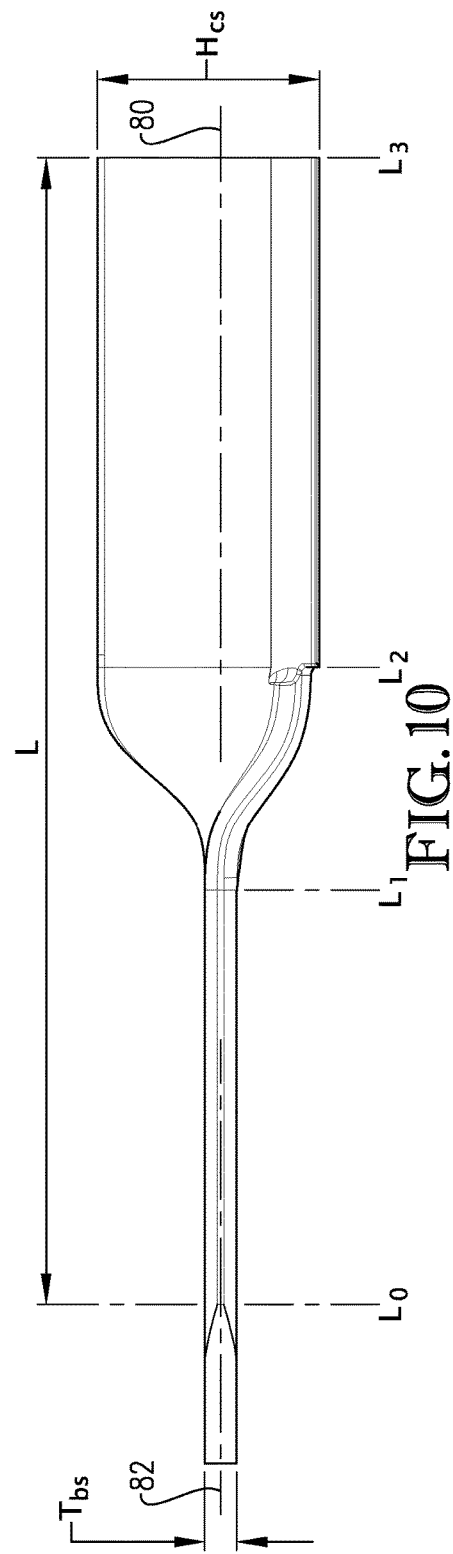
FIG. 10 is a side elevation view of the cutter blade from FIG. 9.

Remaining with the straight blade embodiments of the cutter blades, such as illustrated by cutter blade 24 shown in FIGS. 9-10, such cutter blades 24 are beneficially formed with a generally high center of gravity. To facilitate such a high center of gravity, the cutter blade 24 may be formed with the following dimensions, measurements and/or measurement ranges. As shown in FIG. 10, a length "L" of the cutter blade 24 (as measured from a center of the through-hole 75 of the base section 70 to the distal end 39 of the cutter blade 24) may be between 5 to 30 inches, between 10 and 25 inches, between 15 and 20 inches, or about 18 inches. Nevertheless, embodiments of the present invention may provide for the length "L" to be formed with other lengths as may be required for a specific cutting job or for use with a particular rotary cutter. Furthermore, the cutter blade 24 may extend a distance of between 1 and 5 inches, between 2 and 4 inches, or about 2.5 inches from the through-hole 75 to the proximal end 38 of the cutter blade 24, such that the overall length of the cutter blade 24 may be about 20.5 inches.

Figure 11:
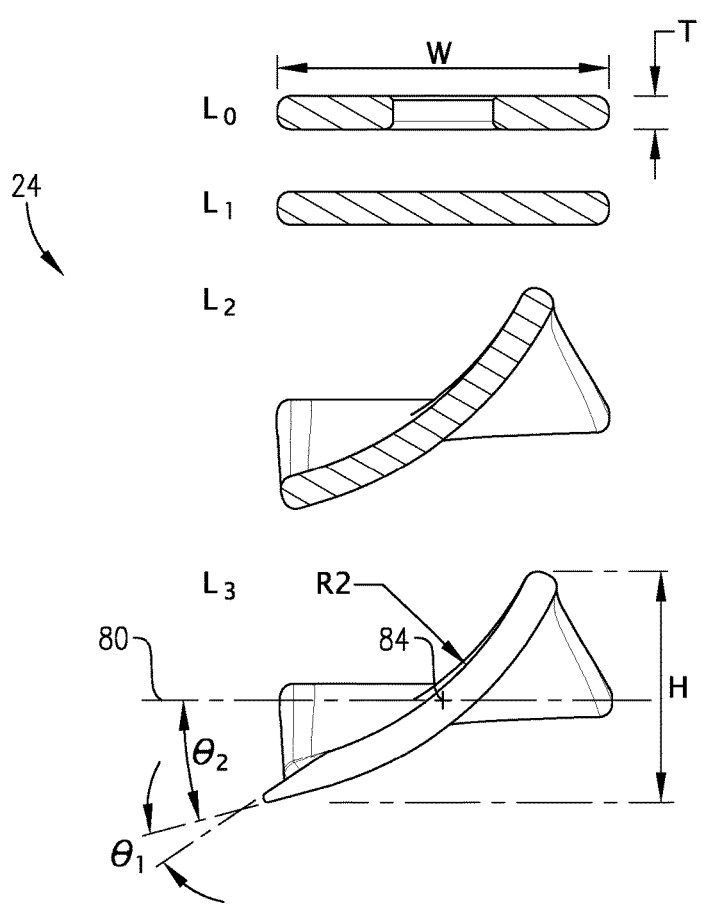
FIG. 11 is four cross-section views of the cutter blade from FIGS. 9 and 10, with the cross-sections taken at L0, L1, L2, and L3 from FIG. 10.

With reference to FIG. 11, the cutter blade 24 may include the width "W" as measured from the leading edge 60 to the back edge 62 of between 2 to 8 inches, between 3 to 6 inches, about 4 inches, or about 5 inches. The thickness "T" of the cutter blade 24, as measured from the lower surface 66 to the upper surface 64, of between 0.1 to 2 inches, between 0.25 to 1 inches, or about 0.5 inches. The height "H" of the cutter blade 24, measured as the maximum vertical distance of the cutter blade 24 between the lower surface 66 and the upper surface 64, of between 1 to 6 inches, between 2 to 5 inches, about 3.14 inches, or about 3.49 inches. It is understood that the height "H" of the cutter blade 24 (i.e., the maximum vertical distance of the cutter blade 24 between the lower surface 66 and the upper surface 64) will generally be, for cutter blade 24, equal to the height "Hcs" of the cutting section 72, as is shown in FIG. 10.

Figure 12:
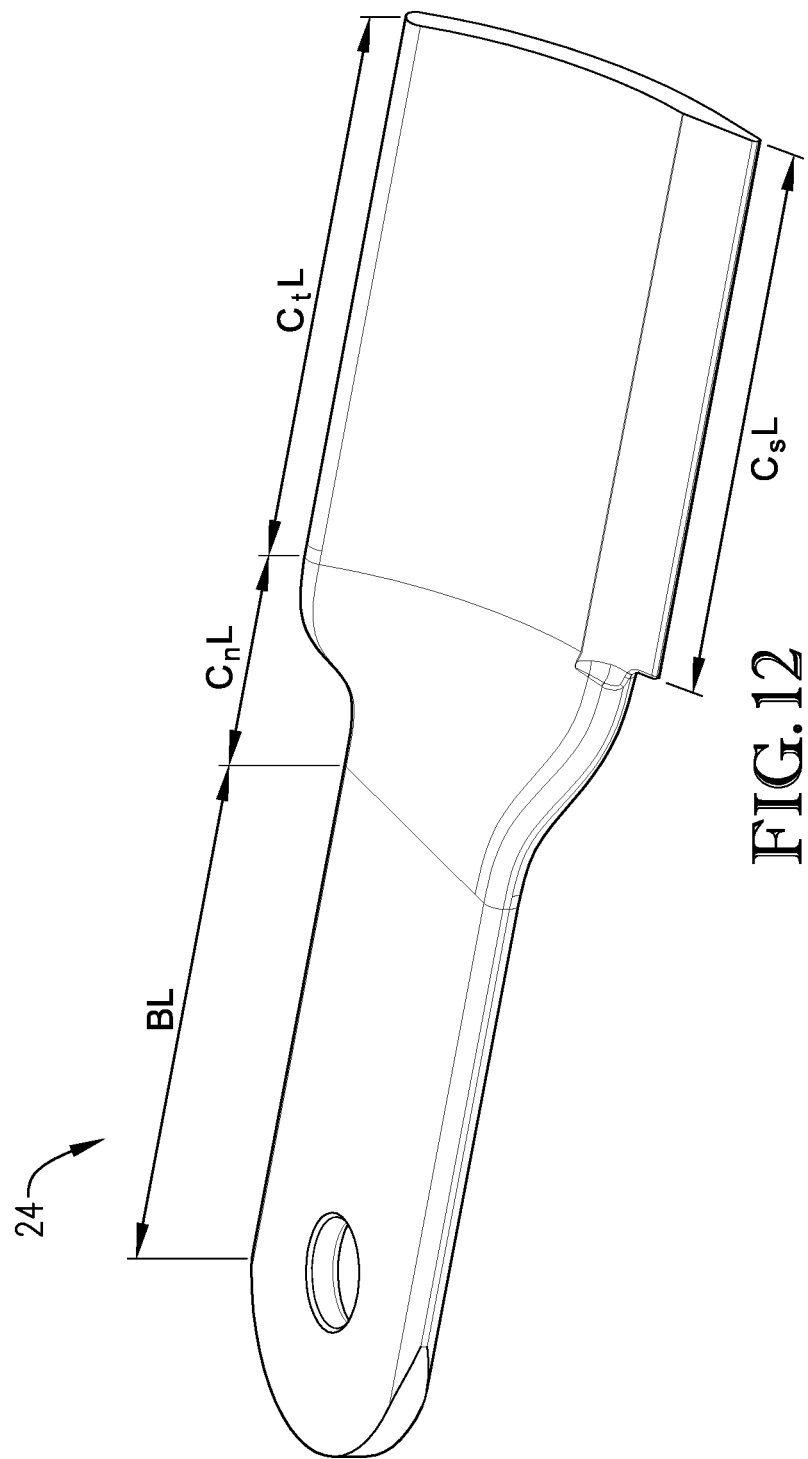
FIG. 12 is an additional perspective view of the cutter blade from FIGS. 9-11.

Turning to the individual sections of the cutter blade 24 in more detail, and with reference to FIG. 12, the base section 70 may have a base length "BL" (as measured from the center of the through-hole 75 of the base section 70 to the connecting section 74). With reference to FIG. 10, the base length BL may be illustrated approximately as L1. The base length BL may be between 4 to 10 inches, between 6 to 8 inches, or about 6.5 inches. In some embodiments, a ratio of the base length BL to the cutter blade 24 length L (i.e., BL:L) may be between 1:5 to 1:2, between 3:10 to 2:5, or about 1:3. Furthermore, in some embodiments, the proximal end 38 of the base section 70 may be rounded so as to facilitate the ability of the cutter blade 24 to rotate with respect to the blade assembly 20 without the proximal end 38 substantially interfering with the blade stop 52. As such, the proximal end 38 of the base section 70 may be formed with a radius of curvature R1 (See FIG. 9) of between 2 and 3 inches, between 2.25 and 2.75 inches, or about 2.5 inches.

Returning to FIG. 12, the connecting section 74 may have a connecting length "CnL" (as measured from the base section 70 to the cutting section 72). With reference to FIG. 10, the connecting length CnL may be illustrated approximately as the distance between L1 and L2. The connecting length CnL may be between 1 to 5 inches, between 2 to 4 inches, or about 3.25 inches. In some embodiments, a ratio of the connecting length CnL to the cutter blade length L (i.e., CnL:L) may be between 1:20 to 2:5, between 1:10 to 3:10, or about 1:5. As previously described, the connecting section 74 may extend in a twisting manner to the cutting section 72. For example, in some embodiments, the leading edge 60 of the connecting section 74 may extend downward to the leading edge 60 of the cutting section 72 a distance of between 1.0 to 1.5 inches, between 1.1 to 1.4 inches, about 1.2 inches, or about 1.3 inches. In addition, the back edge 62 of the connecting section 74 may extend upward to the back edge 62 of the cutting section 72 between 1.2 to 1.9 inches, between 1.3 to 1.8 inches, about 1.4 inches, or about 1.7 inches. As such, the connecting section 74 extends in a twisting manner from the base section 70 to the cutting section 72.

Returning to FIG. 12, the cutting section 72 may have a cutting length "CtL" (as measured from the connecting section 74 to the distal end 39 of the cutter blade 24). As shown in FIG. 10, the cutting length CtL may be illustrated approximately as the distance between L2 and L3. The cutting length CtL may be between 6 to 10 inches, between 7 to 9 inches, or about 8.25 inches. In some embodiments, a ratio of the cutting length CtL to the cutter blade length L (i.e., CtL:L) may be between 1:3 to 2:3, between 2:5 to 3:5, or about 1:2. As indicated above, the cutting section 72 may be formed in an airfoil shape. To create such an airfoil shape, the cutting section 72 may be curved to include a radius of curvature R2, as illustrated in FIG. 11, of between 2 and 7 inches, between 3 and 6 inches, about 3.75 inches, or about 5 inches. The airfoil design may, in some embodiments, provide a lifting force during rotation of the cutter blades 24, which functions to lift vegetation from the surface of the ground so that the vegetation can be more easily cut by the rotating cutter blades 24.

As described previously, the cutting surface 76, may, in some embodiments, extend generally along the entire leading edge 60 of the cutting section 72. As such, and as shown in FIG. 12, the cutting surface may have a length "CsL" may be between 6 to 10 inches, between 7 to 9 inches, or about 8.25 inches. In additional embodiments, however, a portion of the cutting surface 76 may extend along at least a portion of the leading edge 60 of the connecting surface 74. As such, some embodiments may provide for the cutting surface 76 to have a longer length. The cutting surface 76 may be formed to include a sharp edge so as to facilitate cutting of vegetation. For example, as illustrated in FIG. 11, the cutting surface 76 may be formed to include a cutting angle θ1 (defined between the lower surface 66 and the upper surface 64) of between 15 and 23 degrees, between 17 and 21 degrees, or about 19 degrees. In addition, the cutting surface 76 may be formed to include an angle of attack 82 (defined between the lower surface 66 of the cutting section 72 and horizontal plane 82) of between 10 and 30 degrees, between 15 and 25 degrees, about 15 degrees, or about 20 degrees.

Given the dimensions described above, the cutter blade 24 of the present invention can be formed with a center of gravity that is higher than previously-used cutter blades for rotary cutters. In some specific embodiments, such as shown in FIG. 11, the center of gravity 84 may be positioned no lower than (i.e., even with or located above) horizontal plane 82, which bisects height H of the cutter blade 24. In some embodiments, the center of gravity 84 may be positioned between 0.0 to 0.75 inches, between 0.0 and 0.5 inches, or between 0.0 and 0.25 inches above the horizontal plane 80 bisecting a height H of the cutter blade 24. As such, the center of gravity 84 of the cutter blade of the present invention may be positioned between 0.0*H to 0.25*H, between 0.0*H to 0.15*H, or between 0.0*H and 0.10*H above the horizontal plane 82 bisecting a height H of the cutter blade 24.

Given the relatively high center of gravity of the cutter blade 24 of embodiments of the present invention, the cutter blade 24 is restricted from raising into engagement with the blade carrier 22 and/or the deck 12 of the rotary cutter when the blade assembly 20 is caused to rotate. Specifically, even under a significant impulse force, such as caused from the rotary power provided by the PTO of the tractor, the cutter blade 24 of the present invention will not raise significantly into engagement with the blade carrier 22 or the deck 12, thereby alleviating such above-described issues associated with the cutter blade 24 becoming locked in a skewed orientation. As such, the cutter blade 24 of the present invention also reduces unwanted vibration that can result from cutter blades becoming locked in such skewed orientations.

Figure 13:
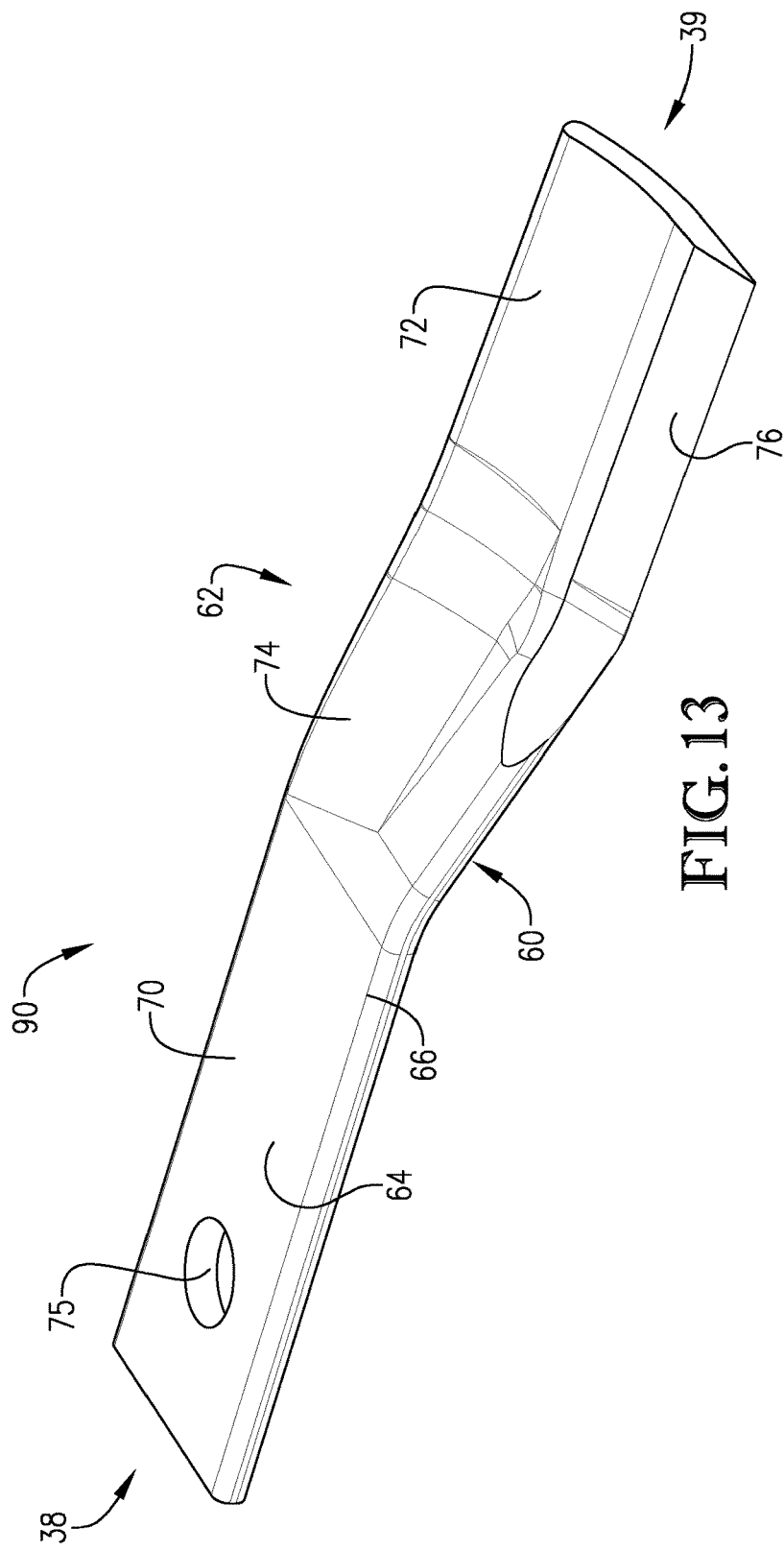
FIG. 13 is a perspective view of a vertically-offset blade cutter blade according to embodiments of the present invention.

Embodiments of the present invention may also be directed to an additional cutter blade 90, as illustrated in FIG. 13, which includes a center of gravity that is generally higher than the centers of gravity included in previously-used cutter blades for rotary cutters. The cutter blade 90 of the present invention may be formed from various types of material with high strength and high durability, such as 5160 or 5160H heat treated steel. In more detail, as shown in FIG. 13, the cutter blade 90 of the present invention broadly comprises a longitudinally-extending blade with proximal end 38, distal end 39, leading edge 60, back edge 62, upper surface 64, and lower surface 66. The proximal and distal ends 38, 39 are separated by a length of the cutter blade 90 and extend along a width of the cutter blade 90. The leading and back edges 60, 62 are separated by the width of the cutter blade 90 and extend along the length of the cutter blade 90. The upper and lower surfaces 64, 66 are separated by a thickness of the cutter blade 90 and extend between the length and the width of the cutter blade 90.

In more detail, and remaining with FIG. 13, the cutter blade 90 may be comprised of three primary sections, including base section 70, cutting section 72, and connecting section 74 that transitions between and connects the base section 70 and the cutting section 72. The base section 70 may extend from the proximal end 38 of the cutter blade 90 to the connecting section 74. The base section 70 may include a through-hole 75 or an opening by which the cutter blade 90 is securable to the blade carrier 22 via the blade pin 26, as was previously discussed. The connecting section 74 may extend at a downward angle from the base section 70 to the cutting section 72. The cutting section 72 may extend from the connecting section 74 to the distal end 39 of the cutter blade 90. The cutting section 72 may be shaped in the form of an airfoil that extends upward from the leading edge 60 to the back edge 62. The cutting section 72 may generally include a cutting surface 76, which extends along the leading edge 60 of the cutter blade 90. The cutting surface 76 may be sharpened to perform the cutting action of the cutter blade 90. In some embodiments, the cutting surface 76 may be milled, while in other embodiments, the cutting surface 76 may be formed by compressing the metal of the cutter blade 90 when it is in a malleable form. In some embodiments, the cutting surface 76 may extend along the entire length of the cutting section 72. In some embodiments, the cutting surface 76 may also extend along at least a portion of the connecting section 72.

In some embodiments, the cutter blade 90, formed according to embodiments of the present invention, may be configured as a "vertically-offset blade." As used herein, the term "vertically-offset blade" is defined to mean that (with reference to FIG. 14) a horizontal plane 92 that bisects a height "Hcs" of the cutting section 72 is positioned at least 0.15*Hcs, at least 0.20*Hcs, or at least 0.25*Hcs below a horizontal plane 94 that bisects a thickness "Tbs" of the base section 70. In general, such vertically-offset blades may include cutter blades in which the distal ends 39 of the cutter blades are positioned lower than the proximal ends 38 of the cutter blades.

Figure 14:
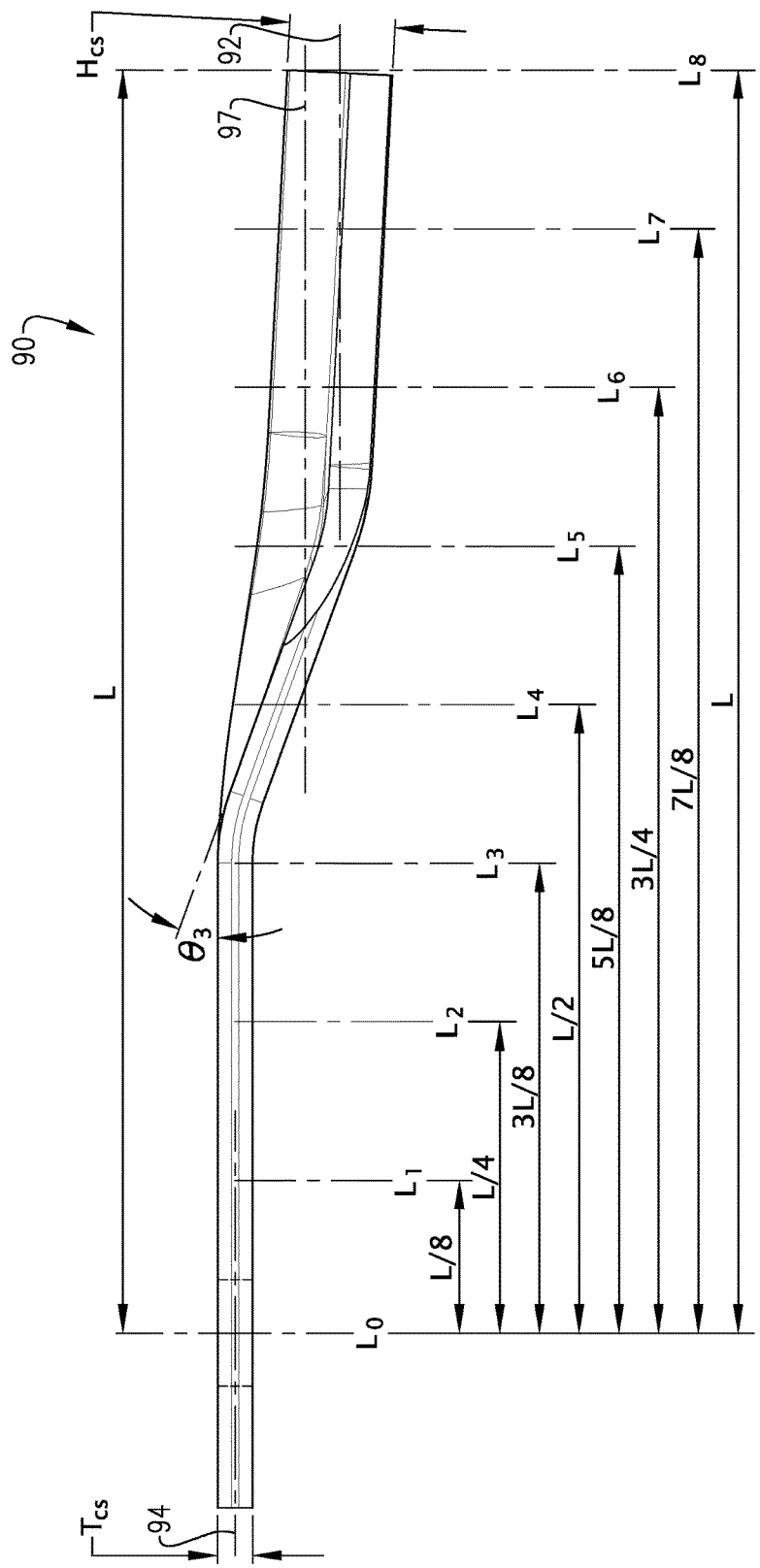
FIG. 14 is a side elevation view of the cutter blade from FIG. 13.
Figure 15:
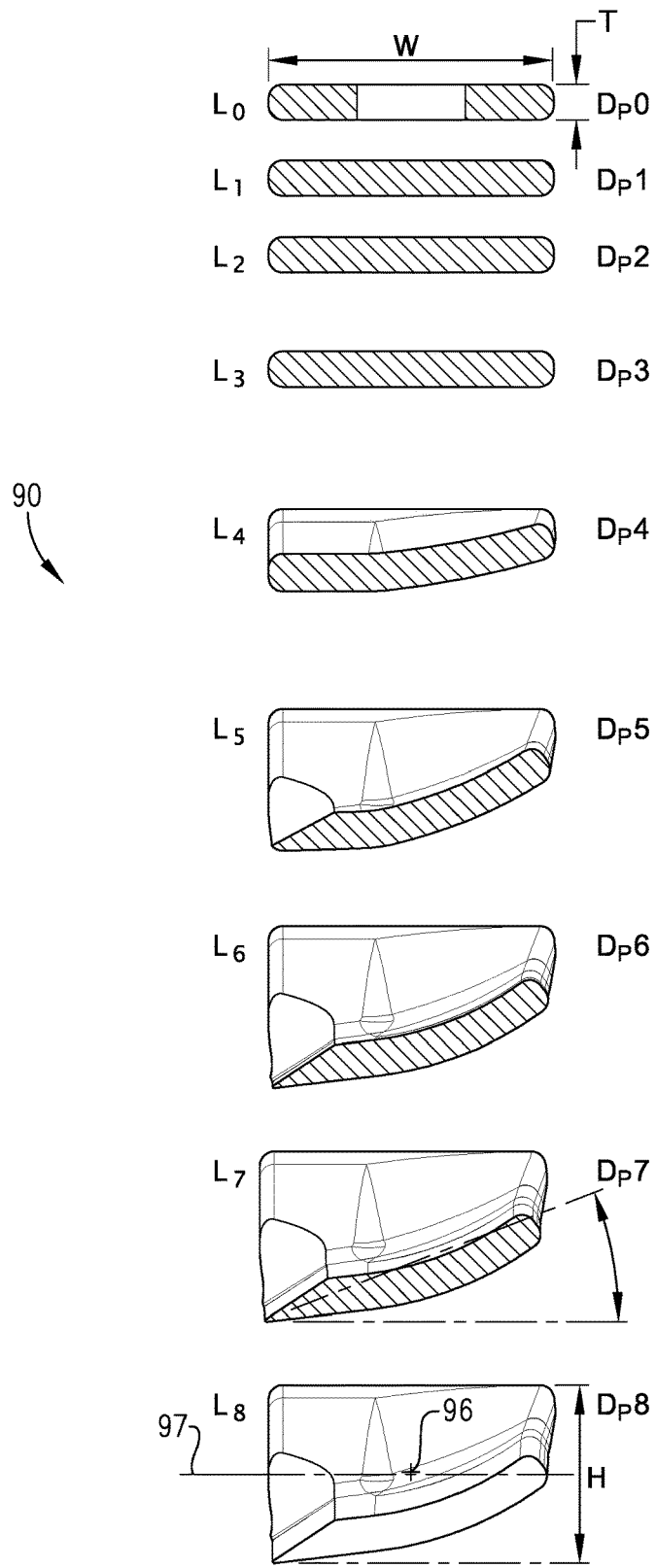
FIG. 15 is nine cross-section views of the cutter blade from FIGS. 13 and 14, with the cross-sections taken at L0, L1, L2, L3, L4, L5, L6, L7, and L8 from FIG. 14.

Nevertheless, to facilitate a generally high center of gravity, the cutter blade 90 may be formed with the following dimensions, measurements and/or measurement ranges. As shown in FIG. 14, a length "L" of the cutter blade (as measured from a center of the through-hole 75 of the base section 70 to the distal end 39 of the cutter blade 90) may be between 5 to 30 inches, between 10 and 25 inches, between 15 and 20 inches, or about 18 inches. However, embodiments of the present invention may provide for the length L to be formed with other lengths as may be required for a specific cutting job or for use with a particular rotary cutter. With reference to FIG. 15, the cutter blade 90 may have a width "W" as measured from the back edge 62 to the leading edge 60 of between 2 to 6 inches, between 3 to 5 inches, or about 4 inches. The cutter blade 90 may have a thickness "T" as measured from the upper surface 64 and the lower surface 66 of between 0.1 to 2 inches, between 0.25 to 1 inches, or about 0.5 inches. The cutter blade 90 may have a depth "H," measured as the maximum vertical distance between the upper surface 64 and the lower surface 66 of between 1 to 4 inches, between 2 to 3 inches, or about 2.5 inches.

Figure 16:
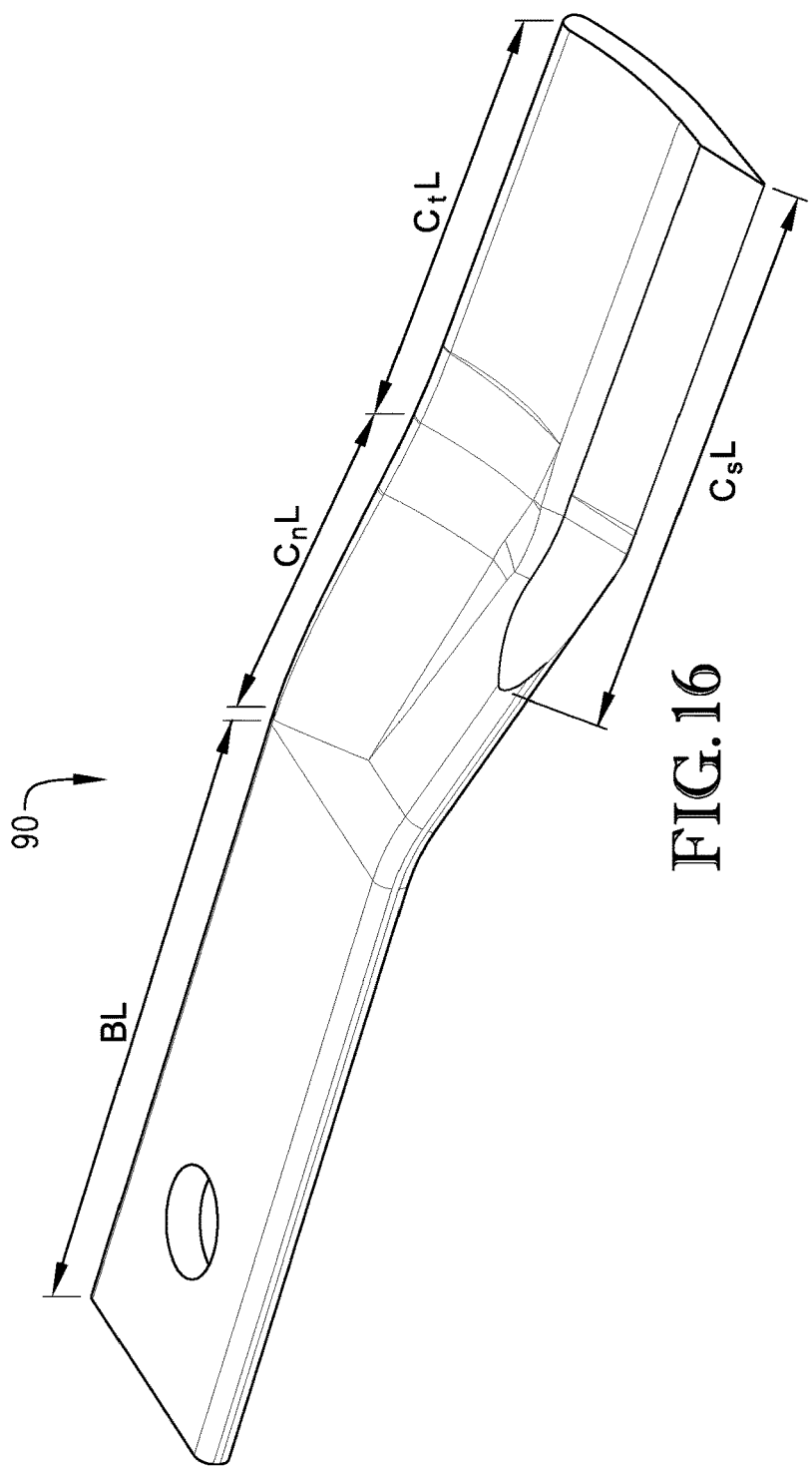
FIG. 16 is an additional perspective view of the cutter blade from FIGS. 13-15.

Turning to the individual sections of the cutter blade 90 in more detail, and with reference to FIG. 16, the base section 70 may have a base length "BL" (as measured from the center of the through-hole 75 of the base section 70 to the connecting section 74 of the cutter blade 90). With reference to FIG. 14, the base length BL may be illustrated approximately as L3. The base length BL may be between 5 to 10 inches, between 6 to 8 inches, or about 7.25 inches. In some embodiments, a ratio of the base length BL to the cutter blade 90 length L (i.e., BL:L) may be between 1:5 to 3:5, between 3:10 to 1:2, or about 2:5.

With reference to FIG. 16, the connecting section 74 may have a connecting length "CnL" (as measured from the base section 70 to the cutting section 72). With reference to FIG. 14, the connecting length CnL may be illustrated approximately as the distance between L3 and L5. The connecting length CnL may be between 3 to 7 inches, between 4 to 6 inches, or about 5 inches. In some embodiments, a ratio of the connecting length CnL to the cutter blade 90 length L (i.e., CnL:L) may be between 1:10 to 1:2, between 1:5 to 2:5, or about 3:10. As previously described, the connecting section 74 may be angled downwardly from the base section 70 to the cutting section 72. In some embodiments, as illustrated in FIG. 14, the connecting section may be angle downwardly at an angle θ3 between 15 and 25 degrees, between 18 and 22 degrees, or about 20 degrees.

With reference to FIG. 16, the cutting section 72 may have a cutting length "CtL" (as measured from the connecting section 74 to the distal end 39 of the cutter blade 90). As shown in FIG. 14, the cutting length CtL may be illustrated approximately as the distance between L5 and L8. The cutting length CtL may be between 3 to 7 inches, between 4 to 6 inches, or about 5.5 inches. In some embodiments, a ratio of the cutting length CtL to the cutter blade 90 length L (i.e., CtL:L) may be between 1:10 to 1:2, between 1:5 to 2:5, or about 3:10.

In some embodiments, at least a portion of the cutter blade 90 may have a partial twist along part of its length L. For example, as illustrated in FIG. 13, the leading edge 60 of the connecting and cutting sections 74, 72 may extend downward from the base section 70 at a steeper angle than the back edge 62. As such, when viewing lateral cross sections of the cutter blade 90, the depth of the cutter blade 90 (measured on the cross-section as the distance between a lowermost portion of the lower surface 66 and the upper most portion of the upper surface 64) may be greater than the thickness of the cutter blade 90. With reference to FIG. 15, the cutter blade may include the following depths "Dp" as measured at the following cross sections (with "L" being the cutter blade length as previously defined): $Dp0=0.03*L$ (measured at the L0 cross-section), $Dp1=0.03*L$ (measured at the L1 cross-section), $Dp2=0.03*L$ (measured at the L2 cross-section), $Dp3=0.03*L$ (measured at the L3 cross-section), $Dp4=0.06*L$ (measured at the L4 cross-section), $Dp5=0.10*L$ (measured at the L5 cross-section), $Dp6=0.12*L$ (measured at the L6 cross-section), $Dp7=0.13*L$ (measured at the L7 cross-section), and $Dp8=0.14*L$ (measured at the L8 cross-section). In some embodiments, the maximum depth Dp of the cutter blade 90 will be at least $0.08*L$, at least $0.10*L$, at least $0.12*L$, at least $0.14*L$, at least $0.16*L$, at least $0.18*L$, or at least $0.20*L$. Furthermore, it is understood that the thickness T of the cutter blade 90 may be approximately $0.03*L$. As such, the depths Dp may alternatively be defined as $Dp0=T$, $Dp1=T$, $Dp2=T$, $Dp3=T$, $Dp4=2*T$, $Dp5=3.3*T$, $Dp6=4*T$, $Dp7=4.3*T$, and $Dp8=4.7*T$.

The twist in the cutter blade 90 provides for the connecting section 74 and the cutting section 72 to include cutting section angle θ4, as measured from the leading edge 60 (which includes the cutting surface 76) to the back edge 62. In some embodiments, as shown in FIG. 15, a maximum value of the cutting section angle θ4 may be between 15 and 25 degrees, between 18 and 22 degrees, or about 20 degrees.

As described previously, the cutting surface 76 may extend generally along the entire leading edge 60 of the cutting section 72. As such, and as shown in FIG. 16, the cutting surface 76 may have a length "CsL" of between 3 to 7 inches, between 4 to 6 inches, or about 5.5 inches. In addition, however, a portion of the cutting surface 76 may extend along at least a portion of the leading edge 60 of the connecting section 74. As such, the cutting surface 76 may have a total length CsL of between 6 to 10 inches, between 7 to 9 inches, or about 8.4 inches.

Given the dimensions described above, the cutter blade 90 of the present invention can be formed with a center of gravity that is higher than previously used cutter blades. In some specific embodiments, such as shown in FIG. 15, the center of gravity 96 may be positioned between 0.1 to 0.75 inches, between 0.25 and 0.5 inches, or about 0.425 inches above a horizontal plane 97 that bisects a maximum height H of the cutter blade 90 (with such horizontal plane 97 also illustrated in FIG. 14). As such, the center of gravity 96 of the cutter blade 90 of the present invention may be positioned between $0.1*H$ to $0.25*H$, between $0.15*H$ to $0.2*H$, or about $0.17*H$ above the horizontal plane 97 that bisects the height H of the cutter blade 90.

Given the relatively high center of gravity 96 of the cutter blade 90 of the present invention, the cutter blade 90 can be prevented from raising and locking with the blade carrier 22 or the deck 12 of the rotary cutter 10 when the cutting assembly is caused to rotate. Specifically, even under a significant impulse force, such as caused from the PTO of the tractor, the cutter blade 90 of the present invention will not raise significantly into engagement with the blade carrier 22 or the deck 12, thereby alleviating issues associated with the cutter blade 90 becoming locked in a skewed orientation. As such, the cutter blade 90 of the present invention also reduces unwanted vibration that can result from previously-used cutter blades that may become locked in such skewed orientations.

Although the invention has been described with reference to the exemplary embodiments illustrated in the attached drawings, it is noted that equivalents may be employed and substitutions made herein without departing from the scope of the invention as recited in the claims.

The invention claimed is:

1. A blade assembly for a rotary cutter, said blade assembly comprising:
   an elongated blade carrier rotatably connected to the rotary cutter;
   at least a first cutter blade and a second cutter blade, with one of said cutter blades secured to each opposite side of said blade carrier, wherein rotation of said blade carrier causes a corresponding rotation of said cutter blades;

an elongated base element secured below said blade carrier, wherein said cutter blades are sandwiched between said blade carrier and said base element;

a pair of elongated stop surfaces associated with said first cutter blade, wherein each of said elongated stop surfaces is configured to engage with a length of a side of said first cutter blade to inhibit rotation of said first cutter blade with respect to said blade carrier; and a pair of elongated stop surfaces associated with said second cutter blade, wherein each of said elongated stop surfaces is configured to engage with a length of a side of said second cutter blade to inhibit rotation of said second cutter blade with respect to said blade carrier.

2. The blade assembly of claim 1, wherein said stop surfaces inhibit said cutter blades from rotating more than 120 degrees from a radial extension with respect to said blade carrier.

3. The blade assembly of claim 1, wherein said cutter blades each comprises a base section and a cutting section, with a proximal end of said cutter blade being located at said base section and a distal end of said cutter blade being located at said cutting section, and wherein each of said cutter blades is configured as a vertically-offset cutter blade in which said distal end is positioned lower than said proximal end.

4. The blade assembly of claim 1, wherein said cutter blades each comprises a base section and a cutting section, and wherein each of said cutter blades is configured as a straight blade cutter blade in which a horizontal plane bisecting a height of said cutting sections is even with or located above a horizontal plane bisecting a thickness of said base section.

5. The blade assembly of claim 1, wherein each of said cutter blades includes a center of gravity that is even with or located above a horizontal plane bisecting a maximum height of said cutter blade.

6. A rotary cutter for cutting vegetation growing from the ground, said rotary cutter comprising:

a deck;

at least one wheel for supporting said deck above the ground; and at least one rotatable blade assembly extending below said deck, wherein said blade assembly comprises a blade carrier, a first cutter blade and a second cutter blade, with the cutter blades secured to opposite sides of said blade carrier, wherein rotation of said blade carrier causes a corresponding rotation of said cutter blades, a base element secured below said blade carrier, wherein said cutter blades are sandwiched between said blade carrier and said base element, a pair of elongated stop surfaces associated with said first cutter blade, wherein each of said elongated stop surfaces is configured to engage with a length of a side of said first cutter blade to inhibit rotation of said first cutter blade with respect to said blade carrier, a pair of elongated stop surfaces associated with said second cutter blade, wherein each of said elongated stop surfaces is configured to engage with a length of a side of said second cutter blade to inhibit rotation of said second cutter blade with respect to said blade carrier.

7. The rotary cutter of claim 6, wherein said rotary cutter is configured to be pulled behind a tractor.

8. The rotary cutter of claim 7, wherein said tractor is configured to provide power to the rotary cutter to cause rotation of said blade assembly.

9. The rotary cutter of claim 6, wherein said stop surfaces are presented by a blade stop, wherein said blade stop inhibits said cutter blades from rotating more than 120 degrees from a radial extension with respect to said blade carrier.

10. The rotary cutter of claim 6, wherein said cutter blades each comprises a base section and a cutting section, with a proximal end of said cutter blade being located at said base section and a distal end of said cutter blade being located at said cutting section, and wherein each of said cutter blades is configured as a vertically-offset cutter blade such that said distal end is positioned lower than said proximal end.

11. The rotary cutter of claim 6, wherein said cutter blades each comprises a base section and a cutting section, and wherein each of said cutter blades is configured as a straight blade cutter blade such that a horizontal plane bisecting a height of said cutting section is even with or located above a horizontal plane bisecting a thickness of said base section.

12. The rotary cutter of claim 6, wherein each of said cutter blades includes a center of gravity that is even with or located above a horizontal plane bisecting a maximum height of said cutter blade.

13. A method of operating a rotary cutter configured to be pulled behind a tractor, the method comprising the steps of:

(a) connecting the rotary cutter to the tractor, wherein the rotary cutter comprises at least one rotatable blade assembly extending below the rotary cutter, wherein the blade assembly comprises a first cutter blade and a second cutter blade, with the cutter blades rotatably secured to opposite sides of a blade carrier, a base element secured below the blade carrier, wherein the cutter blades are sandwiched between the blade carrier and the base element, a pair of elongated stop surfaces associated with the first cutter blade, wherein each of the elongated stop surfaces is configured to engage with a length of a side of the first cutter blade to inhibit rotation of the first cutter blade with respect to the blade carrier, a pair of elongated stop surfaces associated with the second cutter blade, wherein each of said elongated stop surfaces is configured to engage with a length of a side of the second cutter blade to inhibit rotation of the second cutter blade with respect to the blade carrier; and (b) providing power to the rotary cutter to cause rotation of the blade assembly, wherein during said providing power of step (b), the cutter blades are prevented from rotating more than 120 degrees from a radial extension with respect to the blade carrier.

14. The method of claim 13, wherein the cutter blades are configured as vertically-offset cutter blades.

15. The method of claim 13, wherein each of the cutter blades includes a center of gravity that is even with or positioned above a horizontal plane that bisects a maximum height of the cutter blade, such that during said providing power of step (b), the cutter blades are not forced upward into engagement with the blade assembly or with the rotary cutter.

16. The method of claim 13, wherein the power is provided to the rotary cutter via a power take off of the tractor.

17. The method of claim 16, wherein the power is transferred from the rotary cutter to the blade assembly via one or more gear boxes.

* * * * *